(12) United States Patent
Tan (10) Patent No.: US 9,734,412 B2
(45) Date of Patent: Aug. 15, 2017

(54) METHOD AND SYSTEM OF COMMUNICATING VEHICLE INFORMATION

(71) Applicant: Nissan North America, Inc., Franklin, TN (US)

(72) Inventor: Adrian Tan, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 260 days.

(21) Appl. No.: 14/497,037

(22) Filed: Sep. 25, 2014

(65) Prior Publication Data

US 2016/0090039 A1 Mar. 31, 2016

(51) Int. Cl.
*G06K 9/00* (2006.01)
*G08G 1/09* (2006.01)
*H04W 4/04* (2009.01)
*G08G 1/0967* (2006.01)
*G08G 1/00* (2006.01)
*G08G 1/0962* (2006.01)

(52) U.S. Cl.
CPC ... *G06K 9/00791* (2013.01); *G08G 1/096716* (2013.01); *G08G 1/096741* (2013.01); *G08G 1/096791* (2013.01); *G08G 1/20* (2013.01); *H04W 4/046* (2013.01); *G08G 1/09626* (2013.01)

(58) Field of Classification Search
None
See application file for complete search history.

(56) References Cited

U.S. PATENT DOCUMENTS

| | | | |
|---|---|---|---|
| 2007/0021915 A1* | 1/2007 | Breed | B60N 2/2863 701/301 |
| 2009/0002491 A1* | 1/2009 | Haler | B60R 1/12 348/148 |
| 2010/0253492 A1* | 10/2010 | Seder | G01S 13/723 340/435 |
| 2011/0261201 A1* | 10/2011 | Fujii | B60R 1/00 348/148 |
| 2015/0022664 A1* | 1/2015 | Pflug | H04N 7/181 348/148 |
| 2016/0049017 A1* | 2/2016 | Busse | G07C 5/0858 701/33.3 |
| 2016/0137126 A1* | 5/2016 | Fursich | B60R 1/00 348/38 |

\* cited by examiner

*Primary Examiner* — Reza Aghevli
(74) *Attorney, Agent, or Firm* — Global IP Counselors, LLP (57) ABSTRACT

A method of communicating vehicle information, the method includes receiving, via a receiver, notification of an incoming communication from a remote device, capturing with a controller vehicle environment information from at least one onboard vehicle sensor device, transmitting, via a transmitter, the vehicle environment information to the remote device.

18 Claims, 6 Drawing Sheets

METHOD AND SYSTEM OF COMMUNICATING VEHICLE INFORMATION

BACKGROUND

Field of the Invention

The present invention generally relates to a method and system of communicating vehicle information. More specifically, the present invention relates to a method and system disposed in a vehicle that provides vehicle information to a remote device or a third party to assist in the third party understanding the driver situation.

Background Information

Conventional technology exists that enables a third party to communicate with a driver. That is, conventional technology enables a vehicle driver to communicate with a remote third party over a mobile telephone system using a wireless communication system. Such a system enables the driver to communicate with the remote third party in a hands-free mode.

Additional conventional technology exists that enables a vehicle position to be determined and transmitted to a location. Such conventional technology can operate using a GPS or a RF signal that can be monitored by remote receivers.

SUMMARY

It has been discovered that in vehicle communicating systems, the status of the vehicle and driver are generally unknown to a third party using a remote communication device. Thus, in some circumstances, when involved in an ongoing communication with the driver, the third party may contribute to the distraction of the driver of the vehicle. Moreover, in some circumstances it may be desirable to know and/or understand the specific current or the past situation of a vehicle. Accordingly, a method and system of communicating vehicle information, as described herein, enhances the vehicle information provided to a third party using a remote communication device.

In view of the state of the known technology, one aspect of the present disclosure is to provide vehicle information to a third party. In one disclosed embodiment, a method of communicating vehicle information comprises receiving, via a receiver, notification of an incoming communication from a remote device, capturing with a controller vehicle environment information from at least one onboard vehicle sensor device, transmitting, via a transmitter, the vehicle environment information to the remote device.

In one disclosed embodiment, a system for communicating vehicle information includes an on board camera configured to capture an image of a vehicle, and an on board transmitter configured to establish communications with a third party, and transmit the images to the third party.

These and other objects, features, aspects and advantages of the present invention will become apparent to those skilled in the art from the following detailed description, which, taken in conjunction with the annexed drawings, discloses an embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
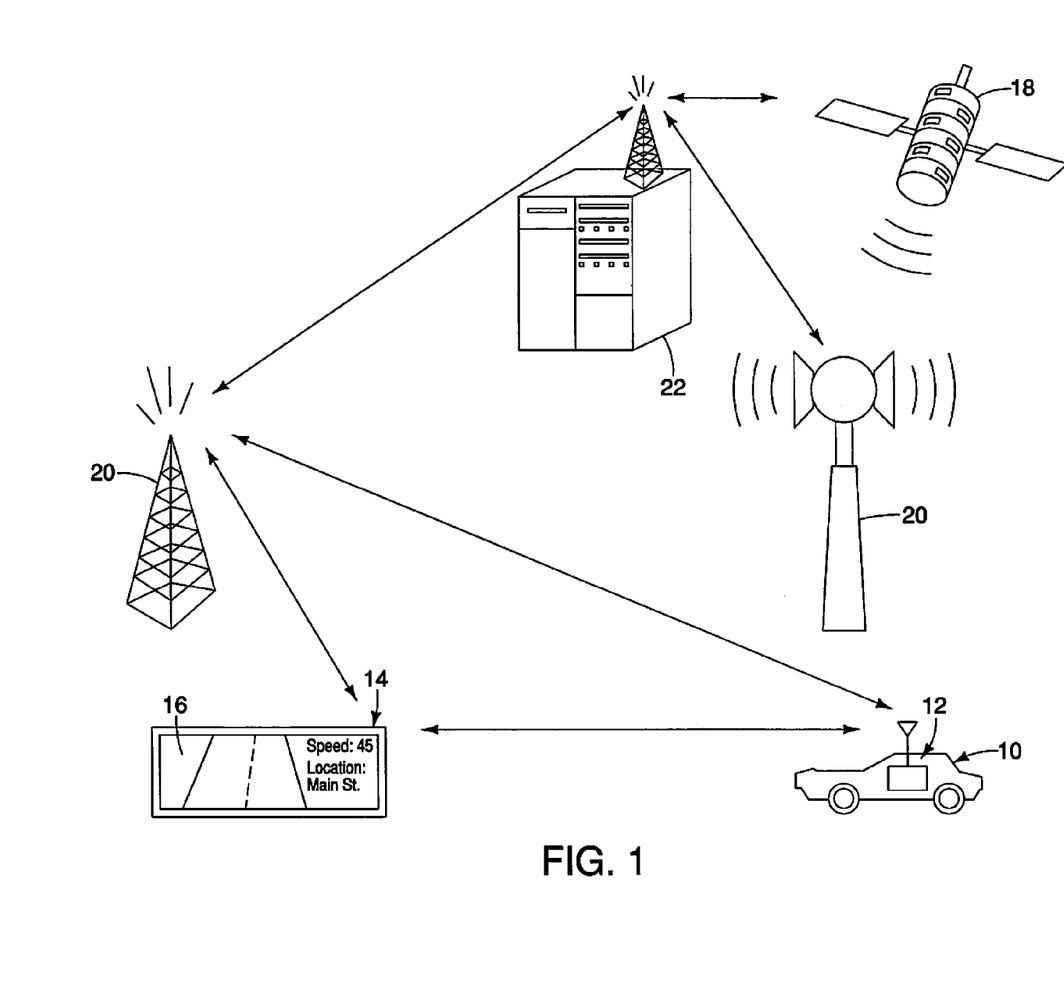
FIG. 1 is a block diagram illustrating an example of a vehicle equipped with a vehicle communication system according to embodiments disclosed herein in relation to a remote device and components of a wireless communication network.

FIG. 1 is a block diagram illustrating a host vehicle 10 that is equipped with a vehicle communication system 12 according to a disclosed embodiment that can communicate with a remote device 14. The vehicle communication system 12 communicates with at least one remote device 14 that can also include a display portion 16.

The vehicle communication system 12 of the host vehicle 10 and the remote device 14 can communicate with a two-way wireless communications network. As seen in FIG. 1, for example, the two-way wireless communications network can include one or more global navigation satellites 18, and one or more terrestrial units, such as roadside (terrestrial) units 20 (two are shown), and a base station or external server 22. The global navigation satellites 18 and the roadside units 20 send and receive signals to and from the vehicle communication system 12 of the host vehicle 10 and the remote device 14. The base station 22 sends and receives signals to and from the vehicle communication system 12 of the host vehicle 10 and the remote device 14 via a network of the roadside units 20, or any other suitable two-way wireless communications network.

Figure 2:
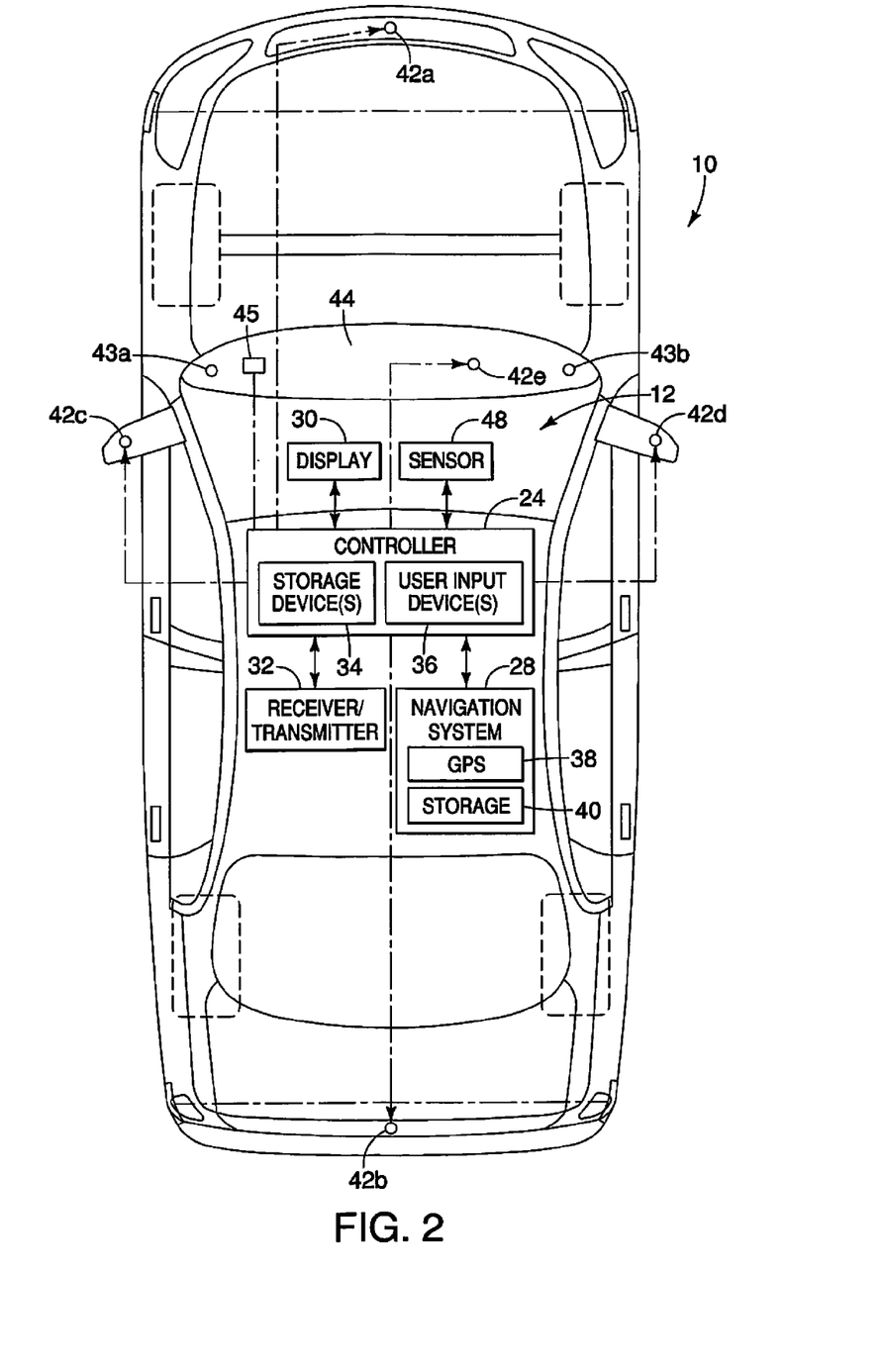
FIG. 2 is a block diagram of an exemplary component of a vehicle equipped with a vehicle communication system according to embodiments disclosed herein.
Figure 3:
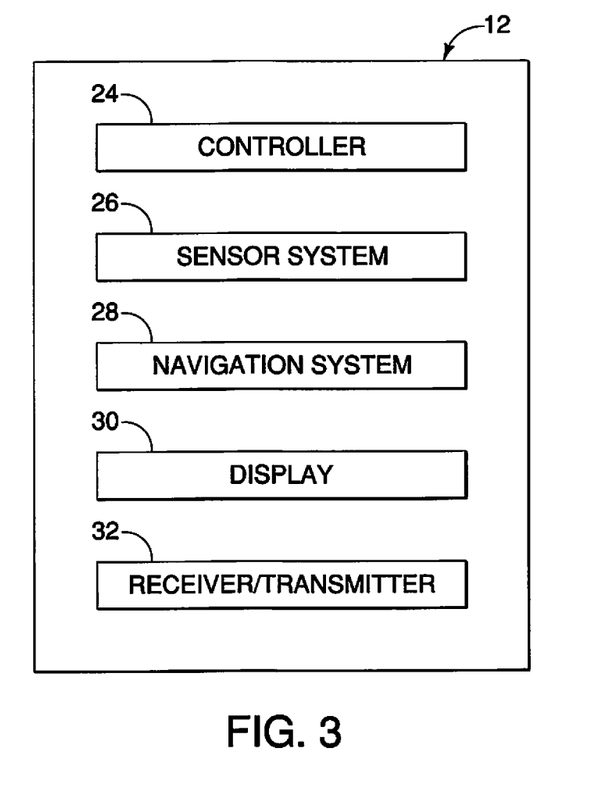
FIG. 3 is a block diagram of exemplary components of a vehicle communication system according to embodiments disclosed herein.

Referring initially to FIGS. 2 and 3, a vehicle communication system 12 for a host vehicle 10 is illustrated in accordance with one embodiment. The vehicle communication system 12 includes a controller 24, a sensor system 26, a navigation system 28, a display 30, and a receiver/transmitter 32.

The controller 24 preferably includes a microcomputer with a control program that controls the components of the vehicle communication system 12 as discussed below. The controller 24 includes other conventional components such as an input interface circuit, an output interface circuit, and storage device(s) 34 such as a ROM (Read Only Memory) device and a RAM (Random Access Memory) device. The microcomputer of the controller 24 is at least programmed to control the vehicle communication system 12 in accordance with the flow chart of FIG. 6 discussed below. The microcomputer of the controller 24 is programmed to control one or more of the sensor system 26, the navigation system 28, the display 30, and the receiver/transmitter 32, and to make determinations or decisions, as discussed herein. The memory circuit stores processing results and control programs, such as ones for the sensor system 26, the navigation system 28, the display 30, and the receiver/transmitter 32. The controller 24 is operatively coupled to the sensor system 26, the navigation system 28, the display 30, and the receiver/transmitter 32 in a conventional manner, as well as other electrical systems in the host vehicle 10, such the turn signals, windshield wipers, lights and any other suitable systems. Such a connection enables the controller 24 to monitor and control any of these systems as desired. The internal RAM of the controller 24 stores statuses of operational flags and various control data. The internal ROM of the controller 24 stores the information for various operations. The controller 24 is capable of selectively controlling any of the components of the vehicle communication system 12 in accordance with the control program. It will be apparent to those skilled in the art from this disclosure that the precise structure and algorithms for the controller 24 can be any combination of hardware and software that will carry out the functions of the present invention. Furthermore, the controller 24 can communicate with the other components of the vehicle communication system 12 discussed herein via, for example a controller 24 area network (CAN) bus or in any other suitable manner as understood in the art.

The controller 24 can include or be in communication with user input devices 36. The user input devices 36 can include, for example, a human-machine interface (HMI) which enables a user (e.g., the driver and/or passenger) to interact with the vehicle communication system 12 as understood in the art and discussed herein. The controller 24 can further include or be in communication with one or more storage devices 34 which can store information as discussed herein.

As further shown in FIG. 2, the vehicle communication system 12 in this example includes or is in communication with a vehicle navigation system 28. The vehicle navigation system 28 includes, for example, a communication device 38, such as a GPS communication device that communicates with the GPS satellites 18. The communication device 38 can also communicate with one or more terrestrial units 20 and a base station 22 or external server to obtain location information. Furthermore, the vehicle navigation system 28 in this example includes or is in communication with a storage device 40 that can store vehicle information, such as previous vehicle route information, location information, or other vehicle information that the GPS is capable of generating, in addition to map data and other location related data as understood in the art. Moreover, the vehicle navigation system 28 can receive vehicle data from any suitable source, such as a remote device capable of connecting with the navigation system 28.

The vehicle communication system 12 in this example further includes or is in communication with a display 30. The display 30 displays, for example, navigation information which indicates the location of the host vehicle 10 with respect to a map as understood in the art. The display 30 can also display warning signals or information related to remote vehicles in the vicinity of the host vehicle 10 that may be of interest to the driver of the host vehicle 10. The display 30 also can display information or views related to a third party in communication with the driver or passengers of the host vehicle 10, as further discussed herein.

In addition, the host vehicle 10 is equipped with a sensor system 26 that can generate or capture vehicle environment information. As will be discussed herein, the vehicle environment information can be any information or data related to the host vehicle 10, including but not limited to, images of the internal environment, images of the external environment, or information related to characteristics of the host vehicle 10 (e.g., vehicle speed, direction, yaw, acceleration, trajectory, heading, vehicle contact warning status, or any other parameter).

The sensor system 26 can be equipped with at least one imaging device such as a high-speed camera. In this example, the host vehicle 10 includes a front imaging device 42a, a rear imaging device 42b, a driver side (or left) imaging device 42c and a passenger side (or right) imaging device 42d. The imaging devices 42a-42d are positioned on the host vehicle 10 to capture real time images (or information) to provide 360 degree field of view imaging about the entire exterior perimeter of the host vehicle 10. Any vehicle information generated by the imaging devices 42a-42d can be stored in the storage device(s) 34 for future review or inspection, as desired.

The sensor system 26 can be equipped with at least one microphone. In this example, the host vehicle 10 includes a driver side (or left) microphone 43a and a passenger side (or right) microphone 43b. The microphones 43a and 43b are positioned on the host vehicle 10 to capture real time sounds (or environment information) to provide 360 degree auditory information about the entire exterior perimeter and interior passenger compartment of the host vehicle 10. Any vehicle environment information generated by the microphones 43a and 43b can be stored in the storage device(s) 34 for future review or inspection, as desired.

The controller 24 in this example receives the image data from the imaging devices 42a-42d and controls the display 30 to display images representing the images captured by the imaging devices 42a-42d for viewing by the driver and/or the passenger(s) as discussed herein. The user, such as the driver and/or passenger(s), can operate the user input devices 36 to change the images being displayed by the display 30. For instance, the user can control the display 30 to display the images captured by any of the imaging devices as desired. The user can also control the display 30 to switch between, for example, displaying navigation information, displaying images captured by the imaging devices 42a-42d, and displaying any other type of information as understood in the art.

Figure 4:
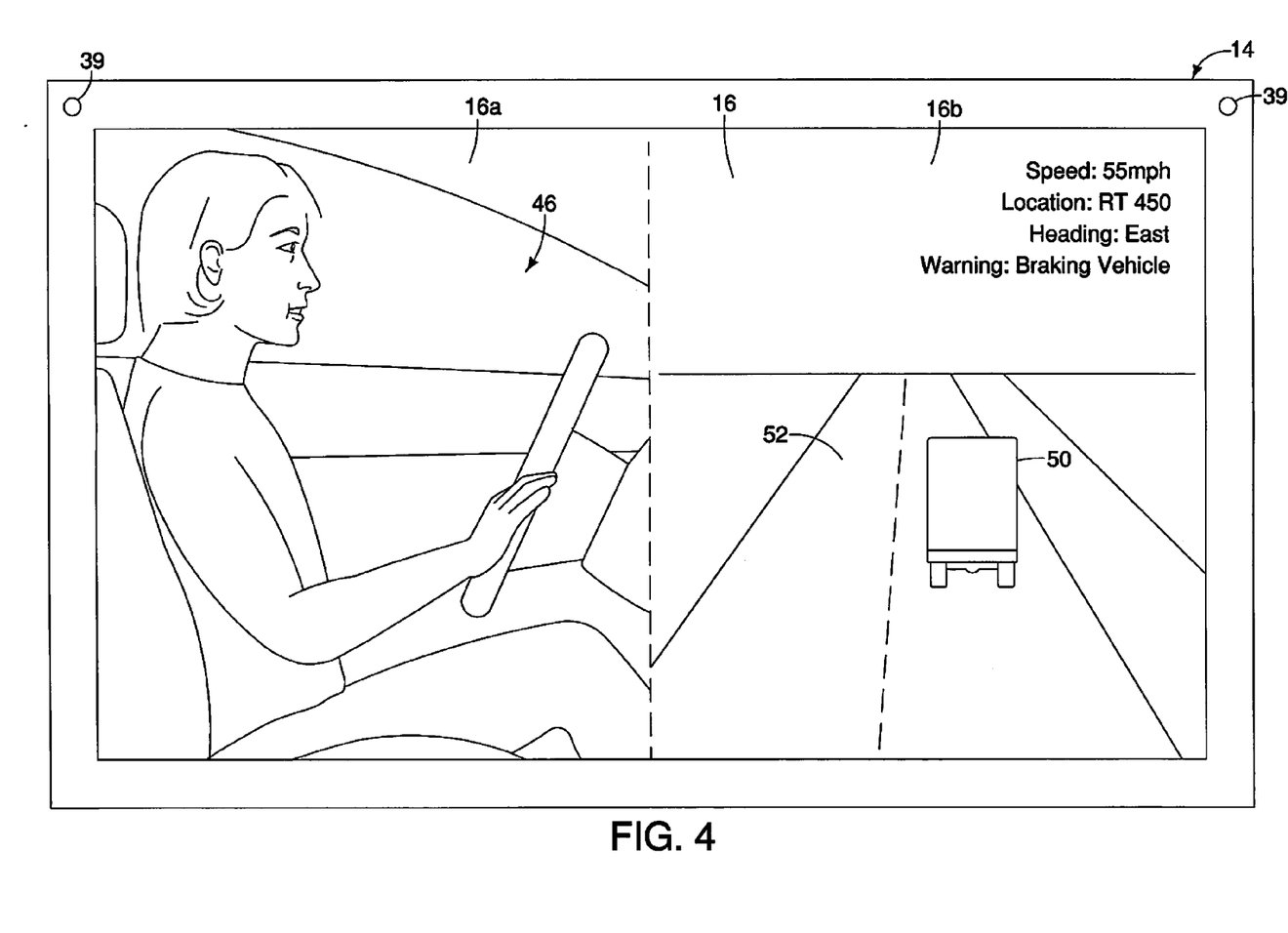
FIG. 4 is a diagrammatic view of a remote device displaying vehicle information.

Further, the sensor system 26 can be equipped with an internal imaging device 42e, such as at least one high-speed camera. The internal imaging device 42e can be positioned on the instrument panel 44 of the host vehicle 10. As shown in FIG. 4, the internal imaging device 42e can capture images of the internal passenger compartment 46, including the driver (driver area) or the passenger (passenger area), rear portion of the passenger compartment to view rear seat passengers, or any suitable internal portion of the host vehicle 10. Moreover, if desired, the internal imaging device 42e can be one of a plurality of internal imaging devices that would be capable of capturing the entire passenger compartment, including the rear seat of the passenger compartment. [The plurality of cameras may be positioned at various positions in the vehicle passenger compartment to adequately view the entire passenger compartment or any desired portion of the vehicle passenger compartment. Any vehicle information generated by the internal imaging device 42e can be stored in the storage device(s) for future review or inspection, as desired.

The sensor system 26 is also equipped with a vehicle parameter sensor 48 or sensors. The vehicle parameter sensor 48 can be any device that is capable of sensing or detecting internal parameters or conditions of the host vehicle 10. For example, the sensor 48 can be a sensor or combination of sensors that detects the vehicle speed, direction, yaw, acceleration, trajectory, heading, vehicle contact warning status, or any other parameter. The vehicle contact warning status can be related any possible situations in which the host vehicle 10 may contact or could possibly contact a remote vehicle 50 or other remote object. For example, the sensor 48 may include sensors that are capable of determining the location of a remote vehicle 50 or object and the distance of the remote vehicle or object and whether that remote vehicle or object relative to the host vehicle 10 may cause a contact situation. Any vehicle information generated by the sensor can be stored in the storage device(s) 34 for future review or inspection, as desired.

Additionally, the sensor 48 can include a wearable device, such as glasses that include a high-speed camera that is capable of capturing images (or vehicle environment information) and a microphone that captures sounds (i.e., vehicle environment information) to be transmitted by the vehicle communication system 12 and displayed and emitted for the third party on a remote device 14. In this embodiment, the remote device 14 is in communication with the controller 24, such that when the head of the driver moves to the left or right, the image transmitted to the remote device 14 changes. For example, when the head of the driver is moved to the left, the vehicle communication system 12 transmits the external vehicle environment information that is to the left of the host vehicle 10. When the head of the driver is moved to the right, the vehicle communication system 12 transmits the passenger area, and/or the external vehicle environment to the left of the host vehicle 10. When the head of the driver is in a straight forward position, the vehicle communication system 12 transmits the vehicle environment information that is to the front of the host vehicle 10. Further, any vehicle occupant can wear such a wearable device, if desired.

In one embodiment, the sensor 48 includes biometric sensors that are capable of sensing the vehicle occupants' biometric status. Thus, the vehicle communication system 12 can transmit data related to increased stress levels of the vehicle occupants to the remote device 14. The biometric data can be sent as an indicator (e.g., driver under high stress), or as raw data (e.g., driver heart rate 125 bpm).

Additionally, the sensor 48 can include a device 45, connected to the controller 24, in the vehicle that monitors and tracks the head movement or eye movement of the vehicle occupant (e.g., a camera). Thus, as the head or eyes of the vehicle occupant moves, the sensor system 12 varies the internal and/or external cameras 42a-42e of the host vehicle to be transmitted by the vehicle communication system 12 and displayed for the third party on a remote device 14. In this embodiment, the remote device 14 is in communication with the controller 24, such that when the head or eyes of the vehicle occupant moves to the left or right, the image transmitted to the remote device 14 changes. For example, when the head of the driver is moved to the left, the vehicle communication system 12 transmits an image from a camera that will view the vehicle environment to the left of the vehicle. That is, the controller can transmit the external vehicle environment information that is to the left of the host vehicle 10 or an internal vehicle compartment image that is to the left of the driver or occupant. When the head or eye of the driver or occupant is moved to the right, the vehicle communication system 12 transmits the passenger area to the right of the occupant, and/or the external vehicle environment to the right of the host vehicle 10. When the head of the driver or occupant is in a straight forward position, the vehicle communication system 12 transmits the vehicle environment information that is to the front of the host vehicle 10 or an internal vehicle compartment image that is to the front of the driver or occupant.

In addition, the host vehicle 10 is equipped with a receiver/transmitter 32. The receiver/transmitter 32 can be separate devices or can be a single device such as transceiver. The receiver/transmitter 32 is configured to send and receive data or information wirelessly to remote devices 14, including mobile phones, remote computers, remote vehicles, or any other suitable device. For example, the receiver/transmitter 32 can send and receive data/information to one or more global navigation satellites 18, and one or more terrestrial units 20, such as roadside (terrestrial) units, and a base station 22 or external server.

Turning now to FIG. 4, a remote device 14 is illustrated that displays images and/or vehicle information from the host vehicle 10 on a display portion 16. That is, on one portion (i.e., a first portion 16a) of the display portion 16, an image of the driver can be displayed. The image of the driver can be an image captured by the internal imaging device 42e that is configured and arranged to capture the driver, along with a portion of the passenger compartment of the host vehicle 10. Additionally, on one portion of the display portion 16 (e.g., a second portion 16b), an image from the front imaging device is displayed. In this figure, the front imaging device has captured an image of the environment in front of the host vehicle 10. The environment includes a portion of the road 52 along which the host vehicle 10 is traveling, and a remote vehicle 50 traveling along the road.

Further, the display portion 16 of the remote device 14 includes vehicle information, such as the speed of the host vehicle 10, the location of the host vehicle 10, the heading of the host vehicle 10 and a warning or vehicle status. The warning or vehicle status in this embodiment is a display of the status of the remote vehicle (i.e., the remote vehicle is in the process of braking). Although the remote device 14 is displaying specific images (i.e., the driver and the environment in front of the host vehicle 10) the remote device 14 can display any suitable image captured by any of the imaging devices discussed herein. That is, the remote device 14 can display any combination of images from the front 42a, rear 42b, left 42c, right 42d and internal imaging device 42e as desired. Further, the user of the remote device 14 can change the image displayed such that the user can selectively view any image or any combination of images from the imaging devices. The controller can transmit the vehicle images, such that as the third party changes the view on the remote device 14, the view can snap between camera views or be stitched together to give the third party a panoramic 360 degree view.

The remote device 14 includes a plurality of speakers 39 capable of emitting stereo sound, or the remote device is capable of transmitting stereo sound to the third party wearing a wired headset or a wireless headset. In this embodiment, the sound from the microphones 43a and 43b is transmitted such that it is emitted by the remote device to enable the third party to understand the auditory environment in the host vehicle 10. The microphones 43a and 43b are configured so as to be capable of creating stereo sound. Thus, the third party may be able to understand whether there are additional people in the host vehicle 10 (e.g., in the rear seat of the passenger compartment) or if a remote vehicle is passing the host vehicle 10. Additionally, stereo sound can improve intelligibility of speech in noise which can help reduce driver distraction.

Moreover, the controller 24 can have the auditory information transmitted to the remote device 14, such that when the third party moves the view on the remote device 14 (i.e., changes the view on the remote device or when the head of the third party moves using a wearable device), the auditory information is also affected. In another embodiment, G-sensors can also be used to send information such as road condition to the remote devices to be communicated by haptic feedback of the remove device held by the user. Thus, vehicle information can include images, text data, sound, and tactile information.

The display portion 16 of the remote device 14 can display any suitable vehicle information. As discussed above in FIG. 4, the display portion 16 is displaying the speed of the host vehicle 10, the location of the host vehicle 10, the heading of the host vehicle 10 and a vehicle contact warning status or other vehicle status. However, the display portion 16 can display any suitable information related to the host vehicle 10 or combination of suitable information related to the host vehicle 10. The vehicle information can be accumulated from the parameter sensor 48 or the cameras 42*a*-42*e* and processed by the controller 24. Thus, the display portion 16 may display the speed for the host vehicle 10 based on information from the parameter sensor 48 and display the braking situation of a remote vehicle based on information from the imaging devices and processed by the controller 24. The displayed information transmitted to remote device 14 can be visually augmented/enhanced to distinguish critical or important information from the not so critical. For example, brake lights detected in the forward image can be recognized and the taillights highlighted in the image or an overlay indicating braking conditions ahead. Further, the noncritical information can be reduced or eliminated so as to not detract from the critical or important information.

Further, the display portion 16 can display information regarding a traffic situation or the external environment adjacent the vehicle based on the images captured by the imaging devices. The display portion 16 can display information received from a remote vehicle, as well as information received from the navigation system 28. For example, some remote vehicles may be capable of communicating a vehicle position or status to the host vehicle 10. This information (e.g., speed and heading) may be transmitted to the remote device 14, and displayed on the display portion 16 of the remote device 14. This information can be displayed in text form or in map form, in which situation, the remote vehicle position and heading can be displayed on a map relative to the vehicle speed and heading.

Figure 5:
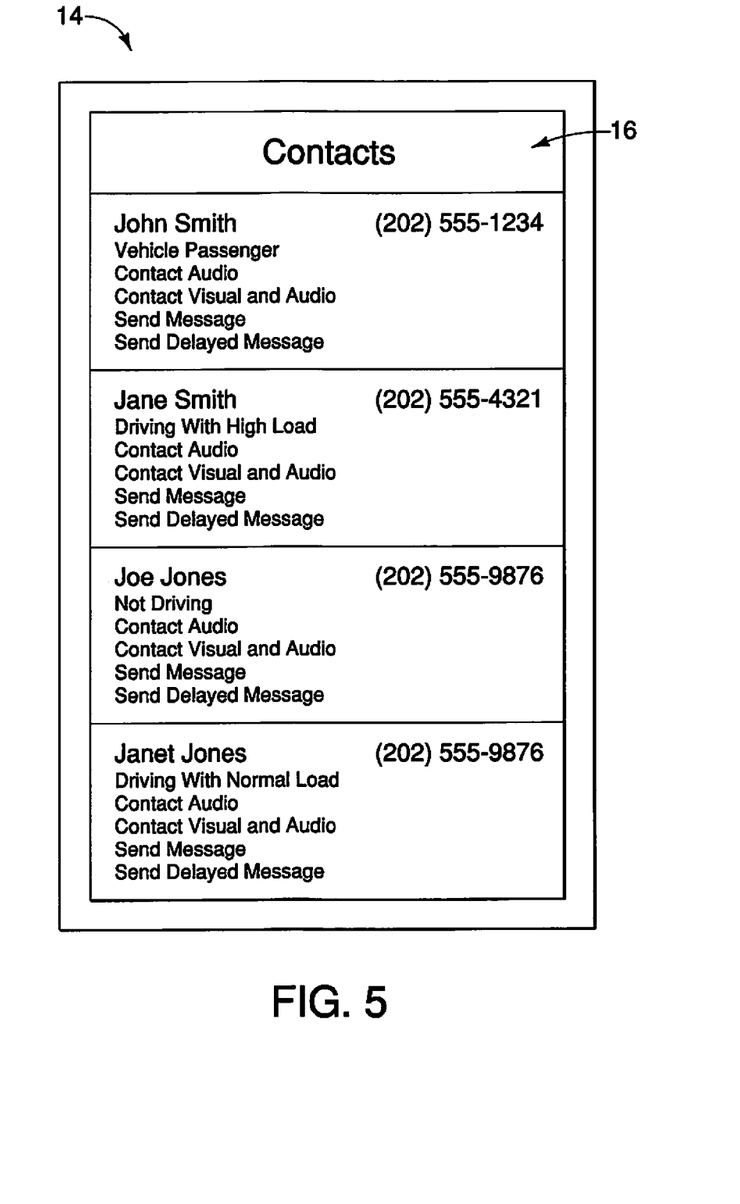
FIG. 5 is a diagrammatic view of a remote device displaying contact information.

As shown in FIG. 5, when the remote device 14 is authenticated to receive host vehicle information, even when no communication is ongoing with the host vehicle 14, the remote device 14 can show the current status of the vehicle to further help reduce excess workload on the driver. For example, when selecting or viewing a contact, the remote device can indicate that the host vehicle 10 is in a vehicle condition that impacts the driving situation, such as "Driving With High Load". Other contact status can be displayed, such as "Vehicle Passenger", "Driving With Normal Load", "Not Driving", or any other suitable status may be displayed. Thus, the third party can be appraised whether it is appropriate to contact the person in the contact list. Moreover, the remote device may be capable of displaying options in contacting the person in the contact list. For example, there can be options such as "Contact Audio", "Contact Visual and Audio", "Send Message", and "Send Delayed Message", or any other suitable options. Thus, when the third party chooses "Send Delayed Message", the controller 24 receives such a message and holds the message until the host vehicle 10 stops, is no longer in a vehicle condition that impacts the driving situation, or is turned off. Such a delayed message status may also be set by the host vehicle driver or any other suitable person. Thus, in this situation, the third party will understand that the host vehicle occupant may not respond immediately and thus the third party can refrain from repeatedly attempting to make contact.

The remote device 14 can be any suitable device. For example, the remote device 14 can be a mobile communication device, a laptop computer, a desktop computer or a tablet computer, or any other suitable device. Additionally, the remote device 14 can include a wearable device, such as glasses that display the vehicle environment information for the third party. In this embodiment, the remote device 14 is in communication with the controller 24, such that when the head of the user moves to the left or right, the image transmitted to the remote device 14 changes. For example, when the head of the user is moved to the left, the remote device 14 displays the driver area. When the head of the user is moved to the right, the remote device 14 displays the passenger area, and/or the external vehicle environment to the right of the host vehicle 10. When the head of the user is in a straight forward position, the remote device 14 displays the external vehicle environment to the front of the host vehicle 10. If desired, the vehicle communication system 12 can include internal imaging devices that would enable a user with imaging glasses to view the status of a host vehicle 10 in a manner similar to a passenger or view the status of the vehicle using the external imaging devices.

Figure 6:
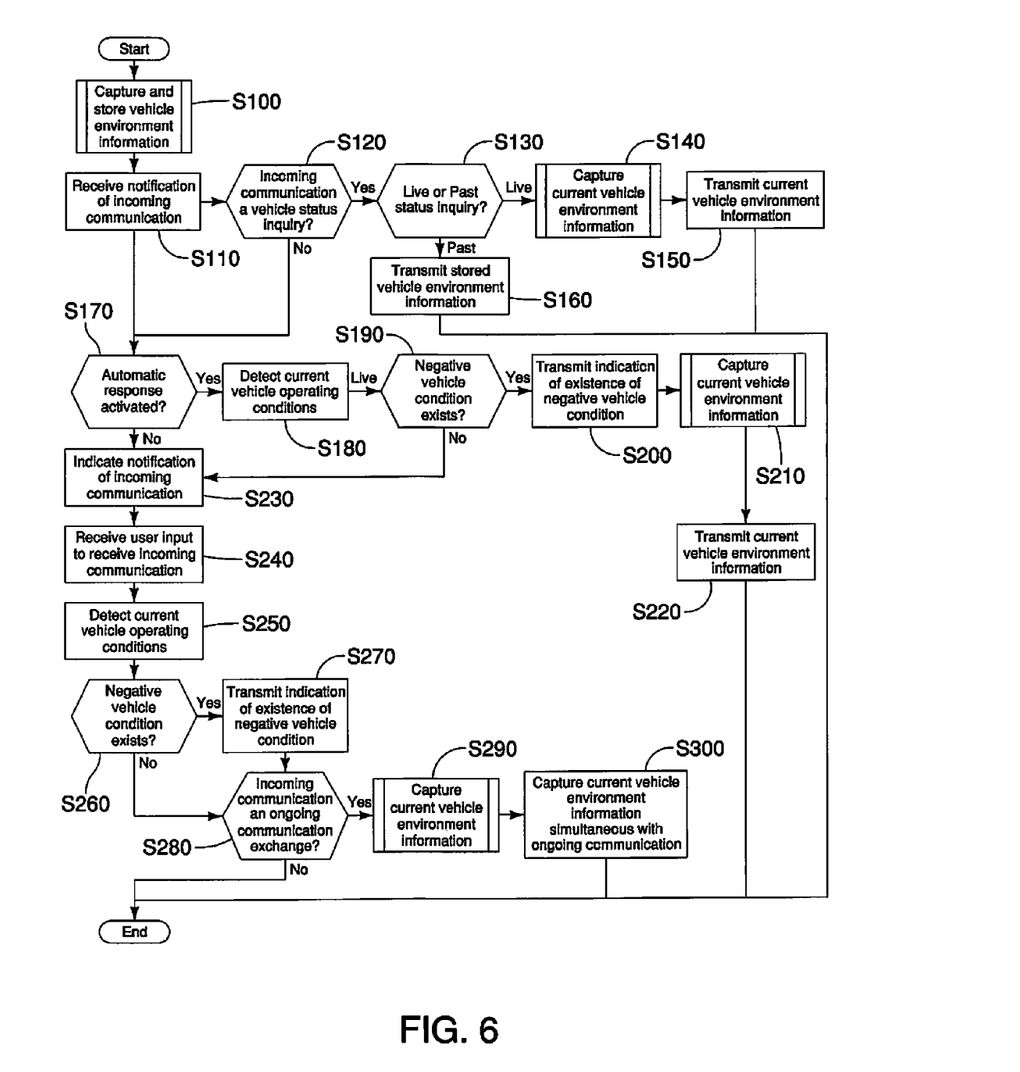
FIG. 6 is a flowchart illustrating an example of operations performed by the vehicle communication system according to embodiments disclosed herein.

FIG. 6 illustrates one embodiment of the procedure of the communication system. First, in S100 the communication system captures and stores vehicle environment information using navigation system, the sensor and/or the imaging devices or any other suitable device capable of capturing vehicle information. This process can be on a continual basis or at predetermined timed intervals or in any other suitable manner. The controller 24 then receives notification of an incoming communication from a remote device 14 or a third party in S110. The controller 24 determines, in S120, whether the incoming communication is a vehicle status inquiry. When the incoming communication is a vehicle status inquiry, the controller 24 determines in S130 whether the inquiry is a live inquiry (i.e., an inquiry of the current status of the host vehicle 10) or a past status inquiry. When it is determined that the inquiry is a live status inquiry, the controller 24 in S140 causes the sensor system 26 to capture the current vehicle environment information. The current environment information can then be transmitted to the remote device 14 or the third party in S150.

When it is determined that the status inquiry is a past status inquiry the controller 24 in S160 causes the past information to be transmitted to the remote device 14 or third party. In one embodiment, the controller 24 continually stores the host vehicle information and stores the host vehicle information in the storage device 40. Thus, the continuous storage enables the vehicle communication system 12 to transmit this information as this past information. Moreover, in S120 when the incoming communication is not a vehicle status inquiry, the notification of the incoming communication is forwarded to the occupants of the host vehicle 10. It is noted that the notification of the incoming communication can be forwarded to the occupants of the host vehicle 10 at any time. That is, the notification can occur simultaneously with the determination of status inquiry or after the vehicle environment is transmitted. Further, if desired, no notification can be forwarded to the documents of the host vehicle 10. For example, the third party may have the ability to request vehicle information without the knowledge of the occupants of the host vehicle 10, including the driver, to determine that the host vehicle 10 is being operated within proper parameters (speed, location, etc.) and/or is being operated in a suitable or safe manner.

On the other hand, when notification of the incoming communication is forwarded to the occupants of the host vehicle 10, the notification can occur on a mobile device or an on board vehicle device or any other suitable device. The notification can be notification of an incoming call, or simply a message that a status inquiry has been requested.

Once the controller 24 receives notification of an incoming communication, the controller 24 in S170 determines if the automatic response has be activated. The automatic response can be activated by the controller 24 based on driver workload, vehicle conditions and/or a manual setting by the driver or passenger using the user input. For example, the driver may not be interested in receiving incoming messages or notifications, or the controller 24 may determine that notifications are not appropriate, such as when driver workload is too high to receive incoming communications. When the automatic response level is set by a manual setting, it can be set from any suitable use interface. The automatic response can be a text message or an auditory message.

When the controller 24 in S170 has determined that the automatic response has been activated, the controller 24 in S180 causes the sensor system 26 to detect the current vehicle operating conditions or vehicle environment information. Based on the current vehicle operating conditions or vehicle environment information, the controller 24 then determines if a vehicle condition that impacts the driving situation exists in S190. A vehicle condition that impacts the driving situation can be any vehicle condition, such as significant traffic, a warning condition indicative of possible contact between the host vehicle 10 and a remote vehicle 50, action of a remote vehicle 50 in proximity to the host vehicle 10 (e.g., braking, lane changing, etc.), the presence of an emergency vehicle or school bus in the vicinity of the host vehicle 10 or any other situation which may require increased attention for the driver. Moreover, the vehicle condition can include the manual activation of blocking incoming messages from remote devices 14. The level of vehicle condition that impacts the driving situation can be set by the driver or other user, or it may be learned by the controller 24 based on previous driver characteristics for each individual driver.

When the controller determines that a vehicle condition that impacts the driving situation of the host vehicle 10 exists in S190, the controller 24 causes the transmitter to transmit the indication of a vehicle condition that impacts the driving situation to the remote device 14 in S200. In one embodiment, the vehicle condition that impacts the driving situation can be transmitted to the remote device 14, such as, via text message or in any other suitable manner. That is, the controller 24 can cause the receiver/transmitter 32 to transmit a text message that the host vehicle 10 is in a high traffic situation or that a contact warning has been activated. Alternatively, the controller 24 can cause the receiver/transmitter 32 to simply transmit that the host vehicle 10 is in a vehicle condition that impacts the driving situation or that the host vehicle 10 is not currently receiving incoming messages. Simultaneously or subsequent to sending the vehicle condition that impacts the driving situation information, in S210 the controller 24 can cause the sensor system 26 to capture the current vehicle environment information and transmit this information to the remote device 14 in S220. In one embodiment, the vehicle condition that impacts the driving situation can be conveyed by a visual image or images from appropriate camera or cameras. In addition, audible warnings (verbal and/or acoustical) can be sent to the remote party, and these warnings can be configured such that they can be audible only to the remote party to reduce driver workload. That is, if desired, the controller 24 can automatically respond to the incoming communication, without providing an indication to the driver.

On the other hand, when the controller 24 determines that there is no vehicle condition that impacts the driving situation in S190, the controller 24 can cause a notification of an incoming communication in S230. The notification can be any suitable notification on a portable device (such as a mobile telephone) or through an on board notification system (either auditory or visual) such as the vehicle HMI. The notification may also be a combination of such devices, as is known in the art. In S240, the driver or other user can then use the user inputs 36 to indicate that a reception of the incoming communication is desired. For example, the user can answer the mobile phone or select an option to enable a text message to be read aloud, or indicate in any other suitable manner that reception of the incoming message is desired. Further, it is not necessary to receive user input. That is, when the controller 24 determines that no vehicle condition that impacts the driving situation conditions exists, the controller 24 may enable a message to be displayed on a display 30 or mobile telephone without reception of user input.

Once the driver or user has indicated that reception of the incoming communication is desired, in S250 the controller 24 causes the sensor system 26 to detect the current vehicle operating conditions or vehicle environmental information. Based on the current vehicle operating conditions or vehicle environmental information, the controller 24 in S260 then determines if a vehicle condition that impacts the driving situation exists. As stated above, a vehicle condition that impacts the driving situation can be significant traffic, a warning condition indicative of possible contact between the host vehicle 10 and a remote vehicle 50, action of a remote vehicle 50 in proximity to the host vehicle 10 (e.g., braking, lane changing, etc.), the presence of an emergency vehicle or school bus in the vicinity of the host vehicle 50 or any other situation which may require increased attention for the driver.

When a determination of a vehicle condition that impacts the driving situation condition of the host vehicle 10 is determined, the controller 24 in S270 causes the receiver/transmitter 32 to transmit the indication of a vehicle condition that impacts the driving situation to the remote device 14. In one embodiment, the vehicle condition that impacts the driving situation can be transmitted to the remote device 14 via text message or in any other suitable manner. That is, the controller 24 can cause the receiver/transmitter 32 to transmit a text message that the host vehicle 10 is in a high traffic situation or that a contact warning has been activated. Alternatively, the controller 24 can cause the transmitter to simply transmit an indication that the host vehicle 10 is in a vehicle condition that impacts the driving situation. Thus, the user of the remote device 14 will understand the driver situation and understand that the driver of the host vehicle 10 may be in a high stress situation or in a situation that requires more than normal attention.

After transmission of the existence of a vehicle condition that impacts the driving situation condition, the controller 24 in S280 determines whether the incoming communication is an ongoing communication exchange (e.g., a telephone call).

Similarly, when the controller 24 determines that a vehicle condition that impacts the driving situation does not exist in S260, the controller 24 determines in S280 whether the incoming communication is an ongoing communication exchange (e.g., a telephone call). While the ongoing communication exchange can be a telephone call, the ongoing communication exchange can be any communication desired, for example, an ongoing text message conversation or other continuous communication. While there is ongoing communication, the vehicle environment information is transmitted to the remote device 14 so the remote party can be continually apprised of the driver situation. Moreover, the controller 24 may transmit additional information to the third party (auditory and/or visual) to further apprise the third party of the vehicle status. Such information may or may not be simultaneously communicated to the vehicle occupants. For example, if the host vehicle 10 determines that the host vehicle 10 is approaching increased traffic situation or is in a possible contact situation with a remote vehicle, the controller 24 may transmit a text or auditory message that of the situation. While the driver may be aware of the situation, the controller 24 may cause the message to be transmitted to the remote device 14 without the knowledge of the driver of the host vehicle 10.

When a determination is made that the incoming communication is not an ongoing communication in S280, the transaction is terminated or ends. Further, when a determination is made that the incoming communication is an ongoing communication in S280, the controller 24 causes the sensor system 26 to capture current vehicle environment information in S290 and transmit this information to the remote device 14 in S300. As described herein, the information can be transmitted simultaneously with the ongoing communication in S300 and the user of the remote device 14 can receive and manipulate the information in any manner, as described herein. At the termination of the ongoing communication, the controller 24 can terminate transmission of the vehicle environmental information. Alternatively, if desired, the communication between the host vehicle occupants and the third party can be terminated, but the controller 24 may cause the vehicle environment information to be continued to be transmitted until later terminated by the third party of the driver or other passenger in the host vehicle 10.

Furthermore, the driver or occupant of the host vehicle can be capable of selectively sharing any and all of the host vehicle information with remote devices. For example, the host vehicle occupants can determine that only vehicle information, such as location and speed can be transmitted to the remote device, and not any images from the cameras. Moreover, controller can transmit the vehicle information to include security such that the information cannot be stored or saved and be only used for purposes of situational awareness.

Accordingly, the vehicle communication system 12, as described herein, enhances the vehicle information provided to a third party using a remote device. Thus, enabling the user of a remote device to understand the driver situation and avoid contributing to driver stress during a vehicle condition that impacts the driving situation. Further, the vehicle information can be aggregated for real time analysis by a third party. For example, the remote device can show clusters of high load drivers visually on a map.

The storage devices and GPS are conventional components that are well known in the art. Since storage devices and GPS are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "front", "rear", "left", and "right" as well as any other similar directional terms refer to those directions of a host vehicle equipped with the vehicle communication system. Accordingly, these terms, as utilized to describe the present invention should be interpreted relative to a host vehicle equipped with the vehicle communication system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of communicating vehicle information, the method comprising:
   receiving, via a receiver, a third party initiated request to communicate from a remote device;
   authenticating the remote device to enable the remote device to receive vehicle information;
   capturing with a controller vehicle environment information from at least one camera and a vehicle operating condition sensor, the vehicle environment information including an image of a viewpoint of the vehicle captured from the camera and a representation of a vehicle operating condition overlaying the image captured from the camera; and transmitting, via a transmitter, the vehicle environment information to the remote device based on the third party initiated request.

2. The method according to claim 1, wherein the vehicle environment information further includes at least one of a vehicle speed, a vehicle acceleration, a vehicle location, a vehicle heading, and a contact warning status.

3. The method according to claim 1, wherein the at least one camera includes a plurality of cameras, and the vehicle environment information includes a plurality of images of a plurality of viewpoints of the vehicle from the plurality of cameras.

4. The method according to claim 3, wherein the plurality of images are transmitted so as to enable selective viewing of the plurality of views of the vehicle by the remote device.

5. The method according to claim 1, wherein the vehicle environment information includes at least one of a vehicle speed, an acceleration, a location, a heading, and a contact warning status.

6. The method according to claim 4, further comprising storing the vehicle information in a storage device.

7. The method according to claim 1, further comprising causing an alert to be activated in the passenger compartment of the vehicle when the receiver receives the request to communicate from the remote device.

8. The method according to claim 1, wherein the transmitting the vehicle environment information to the remote device includes transmitting an automated response indicating a vehicle condition that impacts the driving situation.

9. The method according to claim 1, wherein the camera is disposed within a vehicle compartment, and the vehicle environment information includes images of the vehicle compartment.

10. The method according to claim 1, further comprising determining with the controller a route of the vehicle over a predetermined time, and storing the route of the vehicle in a storage device.

11. The method according to claim 10, wherein the transmitting the vehicle environment information to the remote device includes transmitting the route of the vehicle.

12. A system for communicating vehicle driver information, the system comprising:
a plurality of on board cameras configured to capture a plurality of images associated with a vehicle;
an on board transmitter configured to establish communications with a third party based on the third part initiating a request to communicate, and transmit the plurality of images to a remote device used by the third party upon authentication of the remote device so as to enable the third party to view multiple scenes associated with the vehicle.

13. The system according to claim 12, further comprising a sensor system configured to generate vehicle information including at least one of the vehicle speed, g-forces, acceleration, and heading using internal sensors.

14. The system according to claim 13, wherein the sensor system is configured to generate the vehicle information including information pertaining to the vehicle location.

15. The system according to claim 12, further comprising a storage device configured to store the vehicle information.

16. The system according to claim 15, further comprising a controller configured to determine a route of the vehicle over a predetermined time, and store the route of the vehicle in the storage device.

17. The method according to claim 1, wherein the receiving, via the receiver, the third party initiated request to communicate from the remote device includes receiving the request to communicate telephonically through video or a request to communicate telephonically through audio from at least one of a remote mobile communication device, a remote laptop computer, a remote desktop computer and a remote tablet computer.

18. The method according to claim 1, wherein the receiving the third party initiated request to communicate from the remote device includes receiving a request for the vehicle environment information.

* * * * *